Patented May 2, 1939

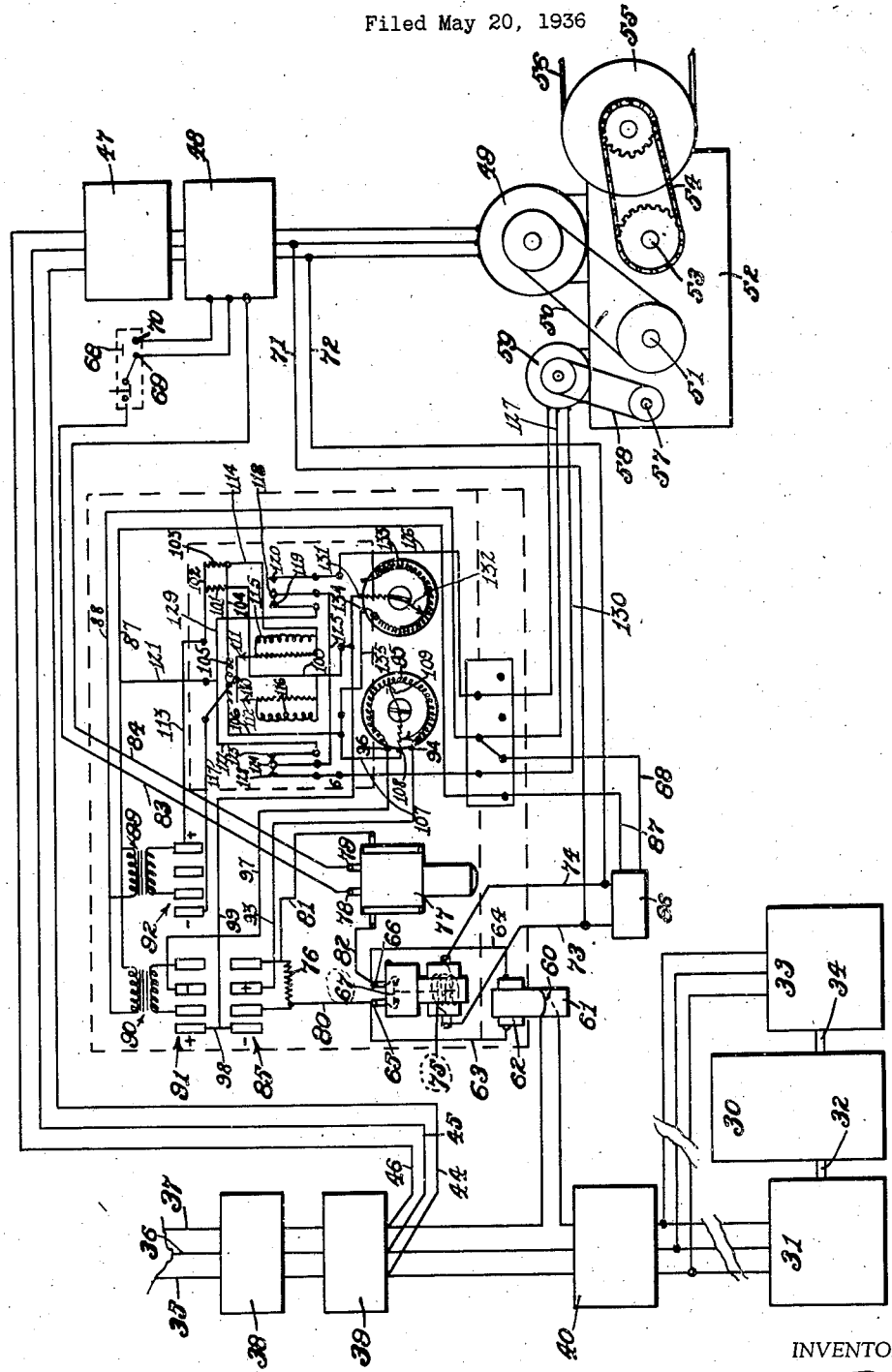

2,156,736

UNITED STATES PATENT OFFICE 2,156,736

MOTOR CONTROL SYSTEM

William R. Perry, Columbus, Ind., assignor to Reeves Pulley Company, Columbus, Ind., a corporation of Indiana Application May 20, 1936, Serial No. 80,653

8 Claims. (Cl. 172—239)

The present application relates to means for maintaining the current demand of a loaded motor substantially constant. More particularly, the invention is directed toward means for so controlling the rate of delivery of material to a machine driven by an electric motor as to maintain the load upon the motor substantially constant.

A primary object of the invention is to provide mechanism, responsive to variations in the rate of current flow in the energizing circuit of a driving motor to control the rate of delivery of material to a machine driven by the motor, in such a manner as to maintain the load impressed upon the motor substantially constant. More particularly, it is an object of the invention to control, automatically, the delivery of material to be pulverized to a pulverizing machine in such a manner as to maintain the current demand of a motor or motors driving said pulverizing machine, substantially constant.

Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

The single figure is a diagrammatic view of an embodiment of my invention.

Referring more particularly to the drawing, it will be seen that I have shown a pulverizer 30 of the type comprising two oppositely rotating grinder discs, one driven by an electric motor 31 driving a shaft 32 and the other driven by a motor 33 driving a shaft 34.

I have indicated a source of current as line wires 35, 36, and 37, entering the organization through a conventional fuse disconnect switch 38 and a starting switch 39. In such an organization, there is customarily provided a reversing switch 40 operable manually to reverse both motors 31 and 33. Wires 44, 45, and 46 connect with the leads 35, 36, and 37 beyond the motor starter, and lead through a disconnect switch 47 and a second motor starting switch 48 to a motor 49 to provide an energizing circuit therefor. Said motor 49 drives, through a belt, or other suitable driving means, the constant speed shaft 51 of a variable speed transmission 52 which may preferably be of the well known "Reeves" type. The variable speed shaft 53 of said transmission drives, through a chain 54 or other suitable driving means, one roll 55 of a conveyor 56. The speed ratio between the shafts 51 and 53 is controllable by operation of a screw shaft 57 which is driven, through a friction clutch (not shown) and a belt 58 or other suitable driving means, by a pilot motor 59.

The conveyor 56 is so positioned and operated as to supply material to be pulverized to the pulverizer 30; and it will be obvious that an increase in the speed of operation of the conveyor will increase the rate of material supply to the pulverizer, and a decrease in the speed of operation of the conveyor will decrease the rate of such supply. It is, broadly, the function of the illustrated organization to reduce the speed of the conveyor when the load upon the motors 31 and 33 increases beyond an optimum maximum; and to increase the speed of the conveyor when the load upon the motors falls below an optimum minimum. It will be obvious that the motor 49 which drives the feeding mechanism cannot operate unless the disconnect switch 38 and the motor starter switch 39 are closed to energize the motors 31 and 33.

To operate the disclosed organization, the switches 38 and 39 are closed by the operator. Since the switch 40 is always closed, in one position or the other, closure of the switches 38 and 39 will energize the motors 31 and 33 to drive the discs of the pulverizer 30.

Immediately upon closure of the switch 39, there will be a surge of current through the energizing circuits for the motors 31 and 33, and thereby through the primary coil 60 of the current transformer 61. A relatively high voltage will be developed at secondary coil 62 of said transformer. If such a voltage were impressed upon the system hereafter to be described, it would have a damaging effect thereon; and consequently I provide wires 63 and 64 leading to terminals 65 and 66 of a normally closed switch 67, thereby short circuiting the said secondary coil 62.

When the motors 31 and 33 have attained normal speed, the voltage developed in the secondary coil 62 will drop to a relatively low value. Thereupon, the button 68 is depressed to connect contact points 69 and 70 to close motor starting switch 48, which will be held closed thereafter through the conventional lock-in circuit. Thereby, the motor 49 will be energized to drive the conveyor roll 55.

Closure of the switch 48 causes current to flow through wires 71 and 72 and wires 73 and 74 to the operating coil 75 for the switch 67, to open said switch 67. Opening of the switch 67 allows the voltage developed in the secondary 62 of the transformer 61 to be impressed upon the resistor 76 and the coil of a normally closed delayed-opening relay switch 77 bridging contacts connected to the posts 78 and 79. Thus current flows from the winding 62 through wire 63, terminal 65, wire 80, resistor 76, wire 81, coil of switch 77, wire 82, terminal 66, and wire 64 to winding 62. The normal intensity of current flowing, in such circuit, through the coil of switch 77 is insufficient to open the switch which bridges the contacts connected with posts 78 and 79; but an undue intensity of current flowing through said coil will tend to open the switch bridging said contacts to break the lock-in circuit for the switch 48, which includes the wires 83 and 84. The switch 77 being a delayed-action switch, however, the energizing circuit for the motor 49 is not thus broken as a result of a mere momentary surge in the circuit including the coil of the switch 77.

Current flowing through the resistor 76 causes the development of a voltage across said resistor, which voltage is impressed upon the input of a dry metallic disc rectifier 85. The wires 71 and 72 also supply current to a transformer 86, and current of reduced voltage therefore flows from the secondary winding of said transformer 86 through wires 87 and 88 to and through the primaries of two transformers 89 and 90. The secondary voltage of the transformer 90 is impressed upon a dry metallic disc rectifier 91, and the secondary voltage of the transformer 89 is impressed upon a dry metallic disc rectifier 92.

The positive terminal of the rectifier 85 is connected, by a wire 93, to one terminal 94 of a potentiometer coil 95, the other terminal 96 of said coil 95 being connected, by a wire 97, to the negative terminal of the rectifier 91. The negative terminal of the rectifier 85 and the positive terminal of the rectifier 91 are directly connected by a wire 98 which, in turn, is connected by a wire 99 and wire 100 to one end of a resistor 101, the opposite end of which is connected by a wire 102 to one end of a resistor 103, the opposite end of which is connected by a wire 104 to one end of the moving coil 105 of a permanent magnet type of galvanometer. The other end of said coil 105 is connected by a wire 106 to a wire 107 which leads to a terminal 108 connected to the arm 109 which sweeps the potentiometer coil 95.

Since the input to the rectifier 91 is of constant voltage, and since the input to the rectifier 85 is of variable voltage, depending upon the demands of the motors 31 and 33, the position of the galvanometer coil 105 will be varied by variations in the demands of the motors 31 and 33. The galvanometer coil 105 mechanically carries the usual needle 110 which, when it is swung from a neutral position, is adapted to make contact alternatively with contact points 111 and 112.

The wire 113, which is connected to the positive terminal of the rectifier 92, leads to the wire 102 which is connected to resistors 101 and 103. Wire 114 leads from the resistor 103 to one end of a coil 115 which, at its opposite end, is connected to the contact point 111. Wire 100 connects the resistor 101 with one end of a coil 116, the opposite end of which is connected to the contact point 112. A wire 117 connects the negative terminal of the rectifier 92 with the galvanometer needle 110. Thus, when the galvanometer needle 110 is turned to make contact with the contact point 111, the coil 115 will be energized; and when said needle is turned to make contact with the contact point 112, the coil 116 will be energized.

An increase in the current demand of the motors 31 and 33 will increase the voltage developed in the secondary 62 of transformer 61, and so will increase the voltage impressed upon the rectifier 85, thus increasing the output voltage of said rectifier. Assuming that, before such increase, the organization has been in balanced operation, such increase in the output voltage of the rectifier 85 will cause a current flow through the coil 105 in such a direction as to swing the galvanometer needle 110 into contact with the contact point 111, thus energizing the coil 115. Such energization of the coil 115 will shift contact element 118 out of contact with element 119 and into contact with element 120, thus closing an energizing circuit for the motor 59 which may be traced as follows: from transformer 86, through wire 87, wire 121, wire 122, contact element 123, contact element 124, wire 125, contact element 118, contact element 120, wire 126, motor 59, common lead 127, and wire 88 to the transformer 86. Energization of the motor 59 through the above-traced circuit will cause operation of said motor in such a direction as to decrease the speed of the output shaft 53 of the transmission 52.

Conversely, when a decrease in the current demand of the motors 31 and 33 causes a decrease in the output voltage of the transformer 62, the output voltage of the rectifier 85 will be decreased, so that the output voltage of the rectifier 91 will exceed the output voltage of the rectifier 85, and a current will flow through the coil 105 in such a direction as to swing the galvanometer needle 110 into contact with the contact point 112, to energize the coil 116. Energization of the coil 116 will shift the contact element 124 into contact with element 128 to close a circuit which may be traced as follows: From transformer 86 through wire 87, wire 121, wire 129, contact 119, contact 118, wire 125, contact 124, contact 128, wire 130, motor 59, common wire 127, and wire 88 to transformer 86. Energization of the motor 59 through the last-traced circuit will cause operation of the motor in the opposite direction to reduce the speed of the output shaft 53 of the transmission 52.

A continuation of the wire 99 leads from its junction with the wire 100 to terminal 131 of a rheostat comprising a contact arm 132 connected electrically to said terminal 131, and a coil 133 adapted to be swept by said arm and connected at one end to a terminal 134. Said terminal 134 is connected, by a wire 135, to the junction between wires 106 and 107.

As has been said, the positive terminal of the rectifier 85 is connected to one end 94 of the potentiometer coil 95; the negative terminal of the rectifier 91 is connected to the opposite end 96 of said coil; and the arm 109 is connected to one end of the galvanometer coil 105, while the opposite end of said galvanometer coil is connected to the wire 99 which joins electrically the negative terminal of rectifier 85 and the positive terminal of rectifier 91. Thus, the constant direct current voltage developed by the rectifier 91 is impressed upon the coil 105 in bucking relation to the variable voltage developed by the rectifier 85. The output speed of the transmission 52, therefore, bears a direct and constant ratio to a factor which is determined by the relation between the magnitude of the voltage developed by the rectifier 91 and the magnitude of the voltage developed by the rectifier 85.

Because of the presence in the organization of the potentiometer coil 95, that factor may be changed. That is, the actual output speed of the transmission for any given current demand of the motors 31 and 33 may be varied by adjustment of the potentiometer arm 109. That is, if the arm 109 is moved in a clockwise direction from the position shown, the output speed of the transmission 52, corresponding to an optimum current flow in the energizing circuits for the motors 31 and 33 will be reduced; and conversely, the normal output speed of the transmission 52 may be increased by turning the arm 109 in a counter-clockwise direction from the position illustrated.

The sensitivity of the galvanometer 105, 110 may be varied by adjustment of the wiper arm 132. Thus, clockwise movement of said arm 132 will decrease the resistance in shunt with the coil 105 to decrease the degree of movement of said coil and the needle 110 in response to a unit change in the intensity of the current flowing through the primary winding 60 of the transformer 61.

I claim as my invention:

1. The method of controlling the current demand of a motor driving a machine for operating on material, which comprises the steps of controlling the rate of feed of such material to such machine, in response to variations in the current intensity in the energizing circuit for said motor by generating a direct-current voltage directly proportional, at all times, to the momentary current intensity in said energizing circuit, generating a direct current voltage of constant magnitude and opposite polarity, and utilizing said variable voltage and said opposite constant voltage in bucking relationship to vary such feed rate in opposite directions in response to opposite differentials between said voltages.

2. In combination with a machine for operating upon a material, an alternating-current electric motor for driving said machine, an energizing circuit for said motor, and a conveyor for feeding material to said machine, a variable speed transmission connected to drive said conveyor and including an element oppositely shiftable to vary oppositely the output speed of said transmission, a reversible alternating-current electric motor connected to shift said element, energizing circuits for said reversible motor, a voltage transformer having its primary connected in said first-mentioned circuit and having its secondary connected to impress its voltage upon a dry metallic disc type rectifier, a second transformer having its primary supplied by a current source of constant voltage and having its secondary connected to impress its voltage upon a second dry metallic disc type rectifier, a galvanometer having a moving coil, a common wire connected to the positive terminal of said second rectifier and the negative terminal of said first rectifier, means connecting the positive terminal of said first rectifier and the negative terminal of said second rectifier, through opposite ends of a potentiometer coil, to one end of said galvanometer coil, means connecting the opposite end of said galvanometer coil with said common wire, a third transformer connected to impress its secondary voltage upon a third dry metallic disc type rectifier, two circuits, each including said third rectifier, the needle of said galvanometer, a contact associated with one end of said needle, and a magnet coil, and a switch associated with each of said magnet coils, each adapted to be closed by energization of its associated magnet coils, each of said switches being connected in one of the energizing circuits for said reversible motor.

3. In combination, a machine to be fed, an electric motor connected to drive said machine, an energizing circuit for said motor, means for feeding material to said machine, a variable speed transmission connected to drive said feeding means, and including an element shiftable in opposite directions to vary oppositely the output speed of said transmission, and automatic means for shifting said element including a reversible electric motor, a source of constant-voltage current, a source of current of a voltage variable in response to current-demands of said first-mentioned motor, and switch means shiftable in response to opposite differentials between said voltages to energize said reversible motor oppositely, and a relay-controlled switch connected in said first-named energizing circuit and operable to open said circuit upon excessive overload thereof.

4. In combination, a machine to be fed, an electric motor connected to drive said machine, an energizing circuit for said motor, means for feeding material to said machine, a variable speed transmission connected to drive said feeding means, and including an element shiftable in opposite directions to vary oppositely the output speed of said transmission, and automatic means for shifting said element including a reversible electric motor, a source of constant-voltage current, a source of current of a voltage variable in response to current-demands of said first-mentioned motor, and switch means shiftable in response to opposite differentials between said voltages to energize said reversible motor oppositely, a switch connected in said first-named energizing circuit, electrical means tending, upon excessive overload of said circuit, to open said switch, and means for delaying movement of said switch to prevent opening thereof as a result of a mere momentary surge.

5. In combination, a machine to be fed, an electric motor connected to drive said machine, an energizing circuit for said motor, means for feeding material to said machine, independent variable-speed drive means for driving said feeding means, an electric circuit for energizing said independent drive means, a switch connected in said motor circuit and in said independent drive means energizing circuit, whereby energization of the latter while the former is deenergized is rendered impossible, and a separate switch in the drive means energizing circuit operable, when said first-mentioned switch is closed, to close said independent drive means circuit.

6. In combination, an electric motor, an energizing circuit therefor, a variable-speed transmission, means for driving said transmission, a reversible electric motor operable to vary the output speed of said transmission, energizing circuits for said reversible motor alternatively operable to drive said reversible motor in opposite directions, control means for said last-named circuits dominated by the intensity of current flow in said first-named circuit, and means operable manually during operation of the system for varying the effect of a given current intensity in said first-named circuit, upon said transmission.

7. In combination, an electric motor, an energizing circuit therefor, a variable-speed transmission, means for driving said transmission, a reversible electric motor operable to vary the output speed of said transmission, separate circuits for alternatively energizing said reversible motor to operate in opposite directions, switch means connected in said last-named circuits, and electrically actuated means for operating said switch means, a source of current variable in response to the current intensity in said first-named circuit impressed upon said electrically actuated means, a constant source of current oppositely impressed upon said electrically actuated means, and manually operable means for varying the effect of one of said current sources upon said electrically actuated means.

8. In combination, an electric motor, an energizing circuit therefor, a variable-speed transmission, means for driving said transmission, a reversible electric motor operable to vary the output speed of said transmission, separate circuits for alternatively energizing said reversible motor to operate in opposite directions, switch means connected in said last-named circuits, and electrically actuated means for operating said switch means, a source of current variable in response to the current intensity in said first-named circuit impressed upon said electrically actuated means, a constant source of current oppositely impressed upon said electrically actuated means, and a rheostat connected between one of said current sources and said electrically actuated means.

WILLIAM R. PERRY.